W. A. SIMONDS.
Gas Regulator.
No. 51,664.  Patented Dec. 19, 1865.
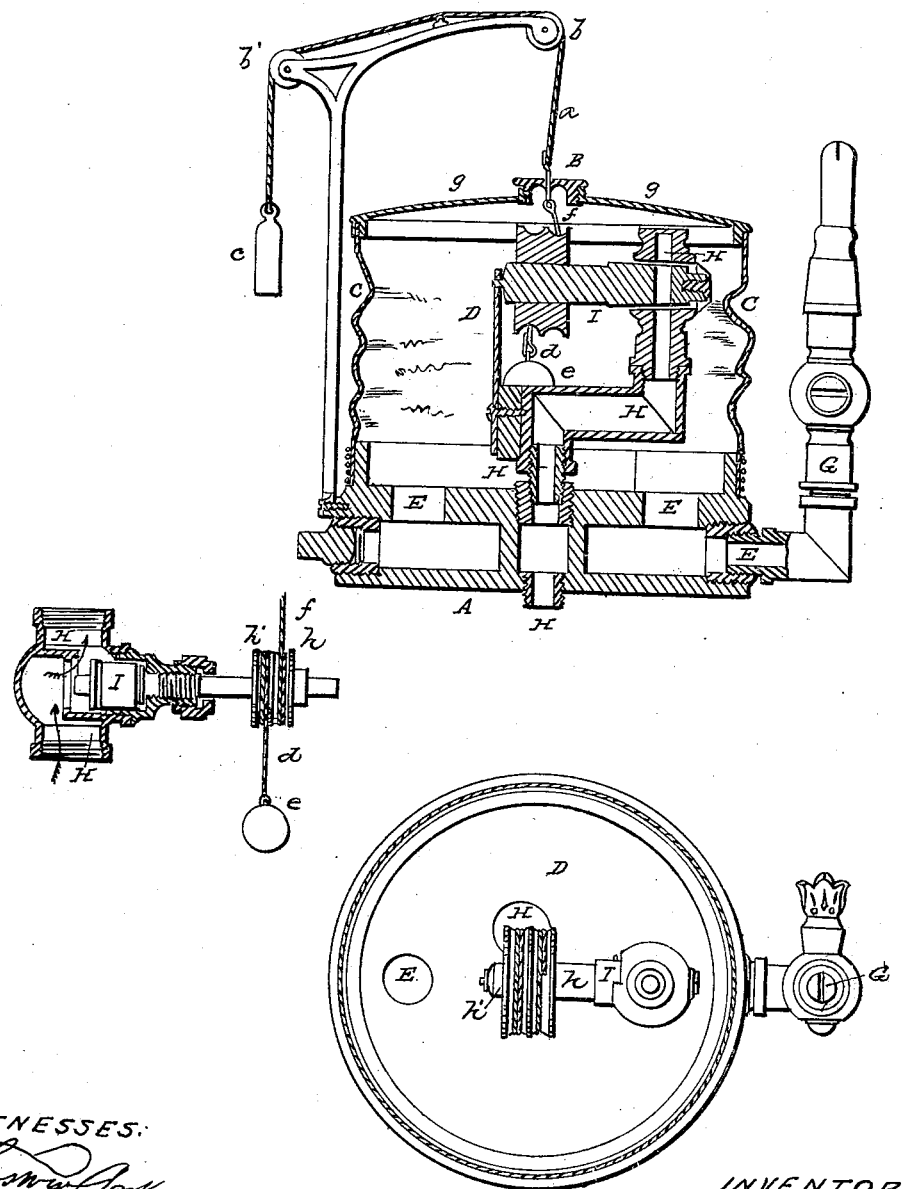
WITNESSES:
INVENTOR.

UNITED STATES PATENT OFFICE.

WARREN A. SIMONDS, OF BOSTON, MASSACHUSETTS, ASSIGNOR TO THE AMERICAN GAS MACHINE COMPANY, OF SAME PLACE.

IMPROVED GAS-REGULATOR.

Specification forming part of Letters Patent No. 51,664, dated December 19, 1865.

*To all whom it may concern:*

Be it known that I, WARREN A. SIMONDS, of Boston, in the county of Suffolk and State of Massachusetts, have invented a new and useful Improvement in Gas-Regulators; and I do hereby declare that the following is a full, clear, and exact description of the construction and operation of the same, reference being had to the accompanying drawings, forming a part of this specification, in which—

Figure 1 is a perpendicular section. Fig. 2 is a cross-section below the disk $g\ g$. Fig. 3 is a section of a regulator-valve with the pulley and cords operating the same.

The nature of the invention consists in making a dry-gas or fluid regulator with a valve affixed to the supply or discharge pipe, and so operated by the predominant force of two counteracting forces— one of which is the pressure of the gas and the other a cord and weight, spring, or other reservoir of force—as to increase or diminish the area of the tube it closes, as the demand for delivery of the gas is increased or diminished.

To enable others skilled in the art to make and use my said invention, I will now proceed to describe the construction and operation of the same.

A is the base of the machine, solidly affixed to some firm body, and $g\ g$ is the metallic convex disk forming its top, with its central opening or man-hole, B, for adjusting the valve-gear. This metallic disk is connected with the base A by a flexible cylinder, of rubber or other suitable material, C, the cavity of which, D, receives gas through the pipe H, with its regulating valve I, and discharges it through one or more passages, E, connected with burners G.

To insure the perpendicular rise and fall of the elastic or flexible cylinder C, its disk $g\ g$ is suspended by a cord passing over pulleys $b\ b'$ and furnished with a counterpoise, $c$.

The valve I may be constructed as a globe or plug valve, as shown in Fig. 1, or as a screw-valve, as shown in Fig. 3, or in any other way allowing the area of pipe H to be gradually enlarged or reduced.

On the shaft of the valve, and operating it by means of cords $f\ d$ coiled about the pulley, is a double pulley, $h\ h'$, firmly fixed to the shaft. Cord $f$ is attached to disk $g\ g$, and rotates the shaft so as to close the valve as the disk rises, and cord $d$, with its weight $e$, rotates the shaft so as to open the valve as the disk falls.

It is obvious that this cord and weight can be replaced by a spring or other equivalent reservoir of force operating in any obvious way to revolve the pulley. It is also obvious that valve I may be placed on discharge-pipe E instead of supply-pipe H, with the same result. It is also clear that valve I may be nominally dispensed with by alternate construction and expansion of an elastic tube operated by connection with disk $g\ g$, substantially as described, or by friction in the convolutions of an elastic tube, straightened or coiled by the rise and fall of the disk.

The discharge of other fluids than gas can also be regulated by this machine.

It will be seen that, the supply of gas being greater when this machine is empty than when it is full, the pressure in tubes E will always be equable, the cavity D filling and disk $g\ g$ rising and closing valve I to such an extent as to cause it to supply to the regulator only such amount of gas as is delivered through tubes E, or said cavity emptying, disk $g\ g$ falling, and the counteracting force opening valve I to a similar extent.

What I claim as my invention, and desire to secure by Letters Patent, is—

In a dry-gas regulator, the combination of the flexible cylinder C and its disk $g\ g$ with the regulating-valve I, so arranged as to increase or diminish the area of the supply-channel H or delivery-channel E, as the demand for the gas through said channel E is increased or diminished, said valve being operated by the predominant of two counteracting forces, viz., the pressure of the gas on disk $g\ g$ and the cord $d$ and weight $e$, substantially as described.

WARREN A. SIMONDS.

Witnesses:
 THOS. WM. CLARKE,
 CHARLES BATEMAN.